Feb. 4, 1941.  E. T. SHAW  2,230,339
CLUTCH MECHANISM
Filed May 6, 1940  2 Sheets-Sheet 1

Inventor
Edward T. Shaw.
George Douglas Jones
Attorney

Feb. 4, 1941. E. T. SHAW 2,230,339
CLUTCH MECHANISM
Filed May 6, 1940 2 Sheets-Sheet 2
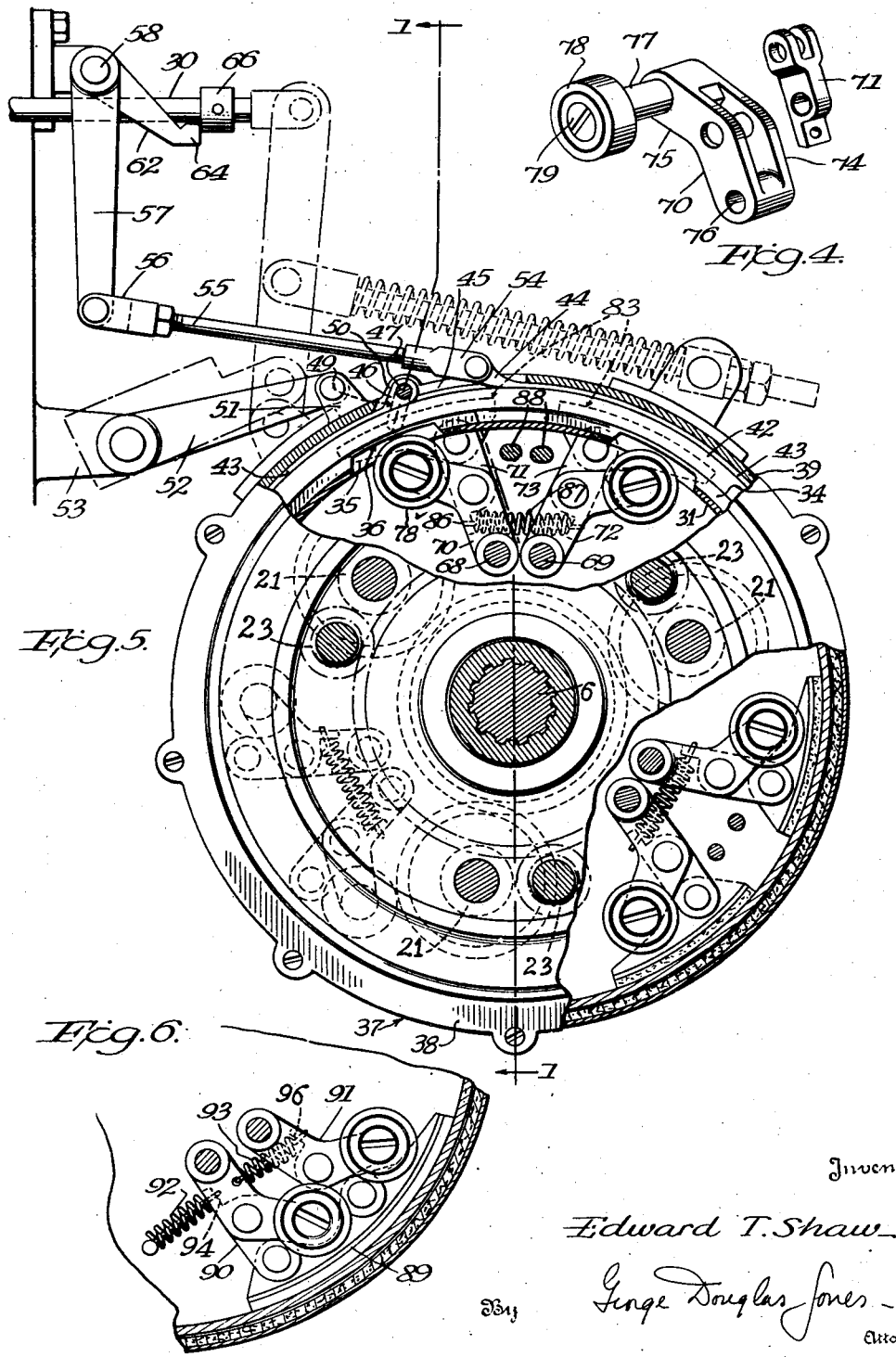
Inventor
Edward T. Shaw
By George Douglas Jones
Attorney Patented Feb. 4, 1941

2,230,339

UNITED STATES PATENT OFFICE 2,230,339

CLUTCH MECHANISM

Edward T. Shaw, Pittsfield, Mass., assignor of one-third to Herbert W. Davis, Pittsfield, Mass., and one-third to Harry P. Chaffee, Rutherford, N. J.

Application May 6, 1940, Serial No. 333,679

13 Claims. (Cl. 192—36)

The present invention pertains to clutch mechanism suitable for controlling the differential steering system of an endless tread type of tractor, and, by way of example, it is shown in such association. Such clutch or brake mechanisms exemplify relative motion in either direction of rotating parts which are separately rotatable in two directions.

Reference is made to my co-pending application Serial No. 172,475, filed November 2, 1937, of which this application is a continuation in part.

In tractor propulsion systems of the type illustrated, steering is effected by the control of a pair of drums arranged at the sides of the differential mechanism, the latter including a pair of planet carriers. With this arrangement one very simple and effective manner of securing the differential lock is to provide means for locking one of the drums and the adjacent planet carrier against relative rotation, with means for rendering such locking means ineffective when straight driving is to be departed from. This particular locking means in preferred embodiment includes a friction shoe or shoes carried by a spider and engageable with the interior surface of the drum flange at least during either direction of driving and during one direction of relative deviation of the straight line corresponding with the tendency to relative rotation of parts in one direction and desirably a similar shoe or shoes are provided for locking action in either direction of driving when tendency to relative rotation of parts reverses.

In utilizing such shoes I provide a novel operating means therefor in the form of toggle links so arranged as to render the shoes self-energizing and readily releasable regardless of the load thereon. This shoe mounting is effectively utilizable in other environments such as brake or clutch systems.

The clutch shoes or such other clutch means as may be provided being carried by the spider and rotating therewith and the control mechanism for the clutch mechanism being necessarily mounted externally of the planet carrier with which the clutch means rotate, it is necessary to provide control means which will be immediately effective to release the clutch means regardless of the angular position of the carrier. A further specifically novel feature of the present invention is the provision of a concentrically contractible and expansible track cooperable with shoe controlling rollers to engage and move the latter in releasing direction whatever may be the angular relation of the spider.

Since the principles underlying the invention and the various novel features thereof will be most readily understood from a description of a specific embodiment, I shall proceed with reference to the accompanying drawings which, as above stated, show the invention as applied to a tractor drive. The basic structure illustrated is that utilized in the well known "Cletrac" tractor and of which disclosures may be found, for example, in Patent No. 1,872,541, issued August 16, 1932, to R. H. White, and Reissue Patent No. 14,938 of August 24, 1920, to the same inventor.

In the drawings:

Fig. 4 shows in perspective a clutch shoe actuating toggle.

Fig. 5 is a section substantially on line 5—5 of Fig. 1; and

Fig. 6 is a fragmentary view partly in elevation and partly in section showing an alternate form of toggle actuated self-energizing clutch shoe.

Figure 1:
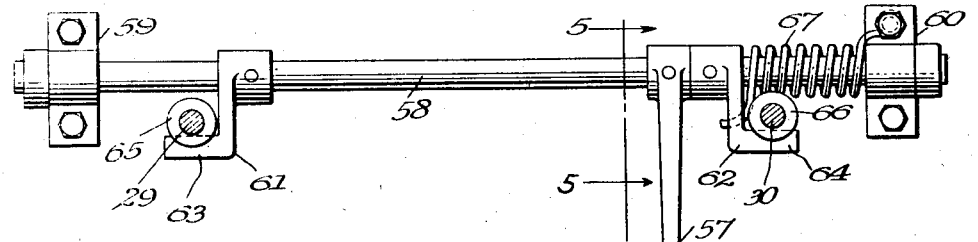
Fig. 1 shows a substantially axial section of the mechanism in relation to a steering differential, a strict section being somewhat deviated for better illustration of details, the section being substantially that indicated by the line 1—1 of Fig. 5.

Referring to Figs. 1 and 5, reference numerals 5 and 6 designate portions of coaxially disposed driven shafts which, as here contemplated, are included respectively in the drives to the sprockets which engage the endless treads. It is immaterial to the present invention through what intermediate mechanism the shafts 5 and 6 are led to their associated sprockets. The shafts are journaled in any suitable manner.

Keyed on the adjacent ends of shafts 5 and 6 respectively are the similar sun gears 7 and 8, and just outwardly of the latter planet carrying spiders 9 and 10 have hubs 11 and 12 rotatably mounted concentrically with the shafts. Rotatably mounted on the hubs 11 and 12 are the drums 13 and 14 respectively, these having the inturned cylindrical flanges 15 and 16 with friction surfaces internally as well as externally. On the drum hubs 17 and 18 are formed the similar pinions 19 and 20 within the drum flanges and adjacent the respective spiders.

Spiders 9 and 10 carry at three equi-distantly spaced points elongated planet pinions as at 21, these being engaged with the sun gear 7 and fixed on shafts to which are likewise fixed planet gears as at 22 in engagement with drum hub pinion gear 19. Spiders 9 and 10 similarly carry a set of three elongated planet pinions 23 which are engaged not only with the sun gear 8, but also in pairs with the elongated pinions as at 21 (Fig. 5); and fixed to shafts of pinions 23 are planet gears, as at 24, which engage the drum hub gear 20.

Brake bands 25 and 26, including the facings 27 and 28, are arranged for cooperation with the external surfaces of drum flanges 15 and 16 respectively. The brake bands are applicable through mechanism including pull rods 29 and 30 and intermediate linkage, the latter being indicated in dot and dash lines in Fig. 5. The pull rods are manually operable as by independent hand levers as shown in the above mentioned patent to White No. 1,872,541, although for present purposes I may arrange the pull rods for pure rectilinear movement by providing suitable bearings and pin and slot connections where arcuate movement of associated parts must be accommodated. The tractor is steered or caused to turn to right or left by applying either one of the bands 25, 26 to its respective drum.

Since the system so far described and its mode of operation are well known, further elaboration is here unnecessary.

According to one means of carrying out the present invention, and as here shown, the spider 10 is provided with an annular peripheral flange 31 extending toward drum 14 and this flange is provided with an external annular groove 32 bounded on the one side by the rib 33 and on the other by the rib 34 of somewhat smaller diameter. At three equidistantly spaced points the flange 31 is provided internally with pairs of recesses as at 35, these being of substantial length, piercing the bottom wall of groove 32 to provide radial slots and extending transversely into ribs 33 and 34 to a substantial extent, the width of the recesses being such as to more than bridge the width of the groove. In this manner arcuate shoulders as at 36, Fig. 5, are provided, these lying substantially outwardly of the bottom of groove 32.

Riding freely on the flange 31 is a ring 37 made up from annular members 38 and 39 which between them define a channel 40 registering with groove 32. Member 39 has an annular lip portion 41 which, through engagement with the free edge of flange 31, prevents displacement of ring 37 to the left, Fig. 1, displacement to the right, same figure, being prevented by the adjacent edge of the drum flange 16.

Positioned in the channel 40 is a concentrically contractible and expansible circular member 42 constituted by a strip of spring metal, such as phosphor bronze or steel, with the strip faces in substantially radial planes. The ends of the strip are at least lapped, but preferably two or more complete turns in sliding side by side arrangement are provided. Member 42 is normally expanded against an operating band 43 which in turn normally lies against the outer wall of channel 40. One end 44 of band 43 is brought out through a slot 45 formed in the outer wall of channel 40. The other end 46 of band 43 is bent around a pin 47 whose ends lie in slots 48 and 49 formed in the side walls 38 and 39 of ring 37 and in a radially extending ear 50 of the side wall 39. The slots 48 and 49 are parallel and are inclined inwardly away from the end 44 of band 43 as indicated in Fig. 5.

An ear 51 projecting radially of ring 37 is connected by means of a link 52 with a fixed bracket 53, Fig. 5, so the ring is held against rotation.

Through a clevis 54, an adjustable pull rod 55 and a further clevis 56, the end 44 of band 43 is pivoted to the free end of an arm 57 whose other end is fixed on a rock shaft 58 mounted in fixed brackets 59 and 60. Arms 61 and 62 fixed on shaft 58 have angularly extending portions 63 and 64 underlying the brake band actuating rods 29 and 30 as particularly shown in Fig. 1, the portions 63 and 64 being immediately engageable by the collars 65 and 66 fixed on rods 29 and 30 when the rods are longitudinally moved in a direction to tighten the brake bands, Fig. 5. Consequently, according to whether rod 29 or 30 is operated, the associated arm 61 or 62 will be engaged and cammed downwardly, thus rocking shaft 58 in a clockwise direction and tensioning band 43, with a substantially straight pull. As a result of this action, pin 47 is caused to move somewhat inwardly in its guide slots to permit a substantially concentric contraction of band 43 and a consequent concentric contraction of member 42. Upon return of the actuated pull rod 29 or 30, a torsion spring 67 whose ends are engaged with arm 62 and bracket 60 respectively, acts immediately to restore the rock shaft to the rest position shown in Fig. 5 so that the tension of band 43 is released and the band is, moreover, given a bodily lengthwise movement to restore pin 47 to the tops of its guide slots. Member 42 expands as a result of its inherent resiliency.

Pivoted on the reduced ends of studs 68 and 69, projecting from spider 10 within the drum 14 are three pairs of toggles, as here shown, each pair including the members 70, 71 and 72, 73 respectively. The toggle 70, 71 appears in Figs. 1 to 5 and will be described in detail, the same description applying to toggle 72, 73 so far as the construction of the toggle parts is concerned. As viewed in Fig. 5 the toggle 70, 71 is the left one and toggle 72, 73 the right one of the uppermost pair. The other two pairs are arranged in the same way.

Member 70 comprises angularly related portions 74 and 75, these portions as here shown being disposed at about a 60° angle to each other. At its free extremity portion 74 is provided with a bore 76 which receives the reduced extremity of the stud 68 and may be retained on the latter by means of a cotter pin 68a as shown in Fig. 1. The free extremity of portion 75 is provided with a threaded bore in which is engaged a stud 77 which at its free end carries a roller 78 mounted on a shoulder screw 79, Fig. 3. The stud 77 and roller 78 represent one form of toggle breaking means which may be associated integrally or otherwise with the respective toggle members.

Intermediate its end portions member 70 is soltted and at the juncture of portions 74 and 75 is pierced to receive a pivot pin 80 on which toggle member 71 is mounted. The free end of toggle member 71 is bifurcated and pierced to receive a pivot pin 81 on which is mounted, in the bifurcation of member 71, an ear 82 of a clutch shoe 83 having a facing 84, the shoe being curved on the radius of the inner surface of flange 16 for cooperation therewith when the toggle is straightened, and under the latter condition roller 78 lies in a recess 35 of flange 31 and may project substantially above the bottom of groove 32 so as to be engageable by member 42 when the latter is contracted. Portion 75 of toggle member 70 is provided with an abutment 85, most clearly seen in Fig. 2, which limits portion 74 and toggle member 71 to a straight line relation in one direction of swing about pivot pin 80. At its inner end member 71 has a longitudinally projecting lug 86.

Figure 3:
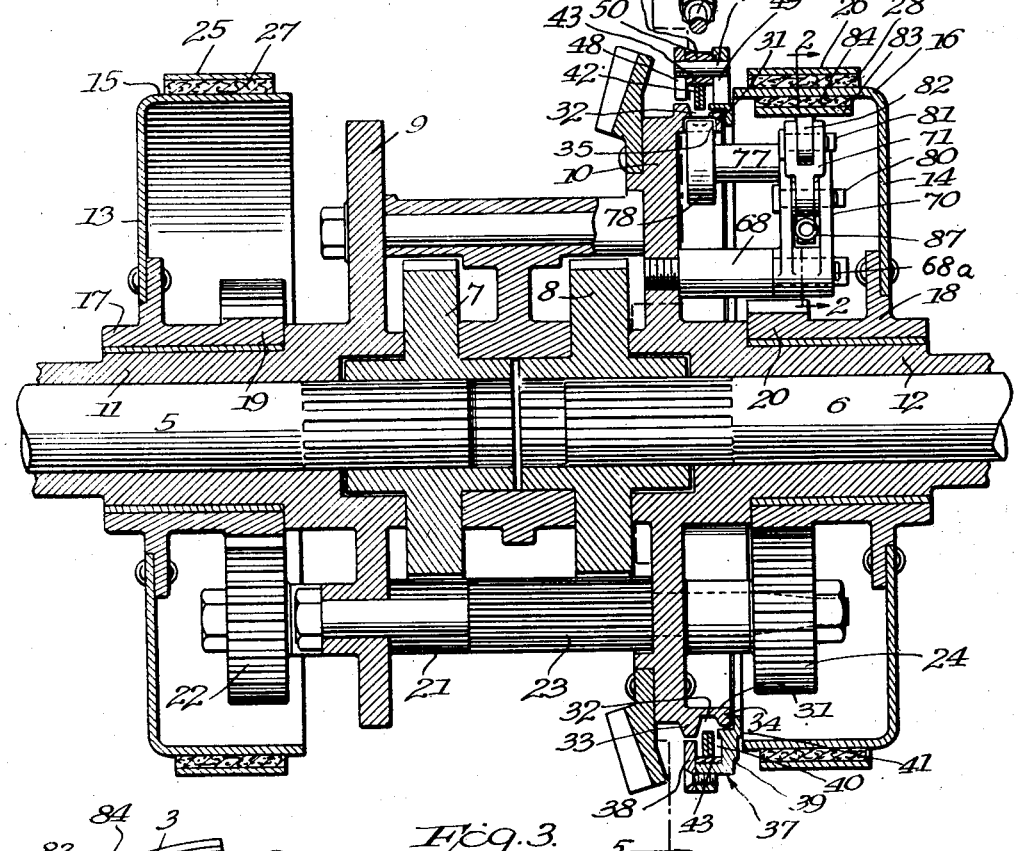
Fig. 3 is a section substantially on line 3—3 of Fig. 2.
Figure 2:
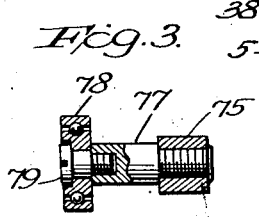
Fig. 2 is a section substantially on line 2—2 of Fig. 1.

Toggles 72, 73 are exactly the same in construction as toggles 70, 71. However, as assembled with the spider they are inclined from the radial in the opposite direction from toggles 70, 71, and the roller-carrying studs as at 77, Fig. 3, are threaded in the opposite side of members 73 in order to bring the rollers in position to enter recesses 35 which are provided therefor in the flange 31. Toggle members 73 have lugs similar to the lugs 86 of toggle members 71 and these lugs are pierced to be engaged by the ends of tension springs 87 which tend to hold each toggle in the straight line relation shown in Fig. 5 with the shoes against the inner surface of drum flange 16.

The three equi-distantly spaced sets of toggle members are preferably provided so as to distribute stresses on the drum flange and spider and thereby reduce and balance distortive effects.

In Fig. 5 a condition such as at stand-still is assumed. The shoes 84 are held in relatively light engagement with the drum flange by means of the springs 87 with each toggle in straight line relation and the rollers spaced radially inwardly from the shoulders as at 36 of recesses 35. If the tractor should not be driven straight and spider 10, due to slippage of a tread, should tend to overtake drum 14 in the clockwise direction of rotation, toggles 72, 73 will move to a more nearly radial position against or substantially against eccentric, adjustable stops 88 on the spider and their associated rollers 78 will approach the shoulders as at 36 of recesses 35 so that the rollers project a substantial distance into groove 32. The clutch shoes are powerfully engaged with the drum flange due to their self-energizing disposition so that relative movement of the spider 10 and drum 14 is prevented and the differential is locked, equal speed of drive to the treads being thus secured. If now either of the pull rods 29 or 30 is operated for the purpose of turning the tractor, one or the other of arm portions 63 or 64 is engaged by the collar 65 or 66 of the operated rod so that band 43 is tensioned, as heretofore described. The consequent concentric contraction of member 42 causes the latter to engage simultaneously all the rollers 78 which project within the groove 32 so that the latter are forced inwardly of the spider, breaking the associated toggles and releasing the associated clutch shoes 83 from flange 16. After this has occurred arm portion 63 or 64 begins to ride on the cylindrical surface of its associated collar so that member 42 is retained in contracted condition and operative tensioning of the brake band in question (28) begins. In other words, while a differential lock is provided which is effective during straight driving, it is automatically rendered ineffective prior to the application of a braking band to a steering drum. Further, the disclosed lock is not positive, but frictional, and slippage may occur under extreme stresses, limited by adjustment of stops 88.

As torque tending to cause relative rotation of parts is applied, ordinary loads are picked up resiliently due to the self-engaging action of the shoes, resulting in a slight angular displacement of parts and increased pressure on friction surfaces with an appreciable distortion of the drum toward triangular shape but well within its elastic limits. When the toggle assemblies come in contact with the stops 88, the resilient cushioning, angular displacement, and increase of pressure cease; extraordinary shock load may result in a slight slippage of the clutch, but only slight, as such extraordinary load cannot be maintained for any but a limited time and distance.

It will be understood that if any tendency of relative rotation between spider 10 and drum 14 occurs in the reverse direction during straight driving, the other set of toggles will become effective to lock the differential, and upon actuation of the steering apparatus will be released in the manner just described.

The toggle mounting of the clutch shoes is an important feature, and a very desirable one, since no matter what the existing torque condition is, the toggles can be easily broken to release the clutch shoes from the drum flange when the tractor is to be turned.

Fig. 6 shows an arrangement wherein a single clutch shoe 89 is mounted on two toggles 90 and 91. The former is normally yieldingly held in straight line position by means of a tension spring 92 anchored at one end to the spider and at the other to a tail 94 on the outer toggle member, the tail 96 of the other outer toggle member being engaged by one end of a tension spring 93 whose other end is anchored to the inner member of the other toggle 90. The operation will be understood from what has gone before, the duplicate toggle arrangement being desirable where extreme loads are to be encountered. The clutch shoe or shoes effective in the opposite direction may be located in the same or drum or in the other drum and in the latter case the clutch controlling mechanism will be duplicated.

Insofar as the subject-matter of the present continuation in part application is concerned, it suffices that the spider 10 and drum 14 are mounted for relative co-axial rotation, and that suitable means exists for anchoring and contracting the band 43. The relation of these functions to a tractor differential steering mechanism and the means for predetermining the sequence of operation of the controls characterize the parent application which has been referred to herein.

While I have specifically described a specific embodiment of the clutch mechanism in a certain environment, it will be understood that the invention is susceptible of varied embodiment without departure from its scope as defined in the following claims.

I claim:

1. In apparatus of the class described, a clutch with revolving toggle members movable in a generally radial direction to actuate the clutch, toggle breaking means associated with each toggle member, a concentrically contractible member orbitally arranged with respect to said toggle breaking means and providing a continuous surface therearound, and means for contracting said contractible member into engagement with the toggle breaking means.

2. In apparatus of the class described, a clutch with revolving toggle members movable in a generally radial direction to actuate the clutch, toggle breaking means associated with each toggle member, a concentrically contractible member orbitally arranged with respect to said toggle breaking means and providing a continuous surface therearound, said contractible member being constituted by a plurality of turns of spring strip metal wound on edge, and means for contracting said contractible member into engagement with the toggle breaking means.

3. In apparatus of the class described, a clutch with revolving toggle members movable in a generally radial direction to actuate the clutch, toggle breaking means associated with each toggle member, a concentrically contractible member orbitally arranged with respect to said toggle breaking means and providing a continuous surface therearound, said contractible member being constituted by a plurality of turns of spring strip metal wound on edge, and means for contracting said contractible member, said contracting means comprising a band substantially surrounding the contractible member and anchored at one end.

4. The combination with a rotary member and a friction shoe for cooperating with a surface of said member, of a toggle pivoted at one end of the shoe and at the other end to supporting means internal of said rotary member, said toggle when straightened holding said shoe against said surface so as to permit circumferential movement with self-energized effect so as to impede or prevent rotation of said member relative to said supporting means, and means for breaking the toggle to release said shoe from said surface.

5. The combination with a rotary member having a friction surface and a friction shoe for cooperating with said surface, of spring means for lightly urging said surfaces into engagement, said shoe being mounted in self-engaging relation to said friction surface, whereby pressure and resistance build up automatically and resiliently in proportion to load applied to impede or prevent rotation of said member relative to said shoe, a stop for limiting the resilient action and load assumed, a collapsible toggle supporting the pressure, and means for collapsing the toggle whereby to provide easy release under load.

6. The combination with a rotary member having a friction surface and a friction shoe for cooperating with said surface, of spring means for lightly urging said surfaces into engagement, said shoe being mounted in self-engaging relation to said friction surface, whereby pressure and resistance build up automatically and resiliently in proportion to load applied to impede or prevent rotation of said member relative to said shoe, an adjustable stop for limiting the resilient action and load assumed, a collapsible toggle supporting the pressure, and means for collapsing the toggle whereby to provide easy release under load, said last named means including a concentrically contractible member and a band substantially surrounding the contractible member and externally anchored at one end.

7. The combination with a rotary drum member and a plurality of friction shoes for cooperating with a surface of said member, of a plurality of equidistant toggles, common supporting means for the toggles, each toggle being pivoted at one end to a friction shoe and at another end to a portion of the common supporting means, said toggles when straightened holding said shoes respectively against said surface and arranged to permit circumferential movement with self-energized effect so as to retard or prevent rotation of said drum member relative to said supporting means, and means for simultaneously breaking the toggles to release said shoes from said surface.

8. The combination with a rotary drum member and a plurality of friction shoes for cooperating with a surface of said member, of a plurality of equidistant pairs of oppositely effective toggles, common supporting means for the toggles, each toggle being pivoted at one end to a friction shoe and at another end to a portion of the common supporting means, said toggles when straightened holding said shoes respectively against said surface and arranged to permit circumferential movement with self-energized effect so as to retard or prevent rotation in either direction of said drum member relative to said supporting means, and means for simultaneously breaking the toggles to release said shoes from said surface.

9. The combination with a rotary drum member and a friction shoe for cooperating with a surface of said member, of supporting means internal of said rotary member, a pair of similar toggles each pivoted by one end to the same shoe and by another end to the supporting means, said toggles when straightened holding said shoe against said surface and arranged to permit circumferential motion with self-energized effect so as to retard or prevent relative rotation of the drum member and the supporting means, and means including a concentrically contractible circular strip of spring metal for breaking the toggles to release said shoe from said surface.

10. In combination, a rotary drum member, a spider having a circular flange provided with an external peripheral groove and a radial opening communicating with said groove, a clutch member carried by said spider and disposed within the drum member, resilient means for normally urging the clutch member against the drum member to prevent relative rotation, means including a roller projecting into said groove through said opening and movable inwardly to render said clutch member ineffective, and means encircling the flange of the spider for moving the roller inwardly.

11. In combination, a rotary drum member, a spider having a circular flange provided with an external peripheral groove and a radial opening communicating with said groove, a clutch member carried by said spider and disposed within the drum member, resilient means for normally urging the clutch member against the drum member to prevent relative rotation, means including a roller projecting into said groove through said opening and movable inwardly to render said clutch member ineffective, and a radially contractible member disposed in said groove.

12. In combination, a rotary drum member, a supporting means having a circular flange provided with an external peripheral groove and a radial opening communicating with said groove, a clutch member carried by said supporting means and disposed within the drum member, resilient means for normally urging the clutch member against the drum member to prevent relative rotation, means including a roller projecting into said groove through said opening and movable inwardly to render said clutch member ineffective, and a radially contractible member disposed in said groove, and means for contracting said member.

13. In combination, a rotary drum member, a supporting means having a circular flange provided with an external peripheral groove and a radial opening communicating with said groove, a ring member loosely encircling the circular flange of the supporting means and provided with an internal peripheral groove and parallel inclined slots in the sides thereof, a clutch member carried by said supporting means and disposed within the drum member, resilient means for normally urging the clutch member against the drum member to prevent relative rotation, means including a roller projecting into said external groove through said opening and movable inwardly to render said clutch member ineffective, a radially contractible member disposed in said external groove, and means for contracting the contractible member, said last-recited means including an operating band disposed in said internal groove and anchored by one end in the slots of the ring member.

EDWARD T. SHAW.